(12) United States Patent
Micko

(10) Patent No.: US 8,354,643 B2
(45) Date of Patent: Jan. 15, 2013

(54) INFRARED MOTION SENSOR

(75) Inventor: Eric S. Micko, Hong Kong (CN)

(73) Assignee: Suren Systems, Ltd. (HK)

( * ) Notice: Subject to any disclaimer, the term of this patent is extended or adjusted under 35 U.S.C. 154(b) by 170 days.

(21) Appl. No.: 12/914,284

(22) Filed: Oct. 28, 2010

(65) Prior Publication Data

US 2011/0210253 A1 Sep. 1, 2011

Related U.S. Application Data

(60) Provisional application No. 61/279,968, filed on Oct. 29, 2009.

(51) Int. Cl.
*G01J 5/02* (2006.01)
(52) U.S. Cl. .................................................. 250/339.05
(58) Field of Classification Search ............. 250/DIG. 1, 250/339.05
See application file for complete search history.

(56) References Cited

U.S. PATENT DOCUMENTS

| | | | | |
|---|---|---|---|---|
| 4,882,491 A | * | 11/1989 | Tamura et al. | 250/338.3 |
| 4,963,749 A | * | 10/1990 | McMaster | 250/349 |
| 2005/0043907 A1 | * | 2/2005 | Eckel et al. | 702/62 |
| 2007/0018106 A1 | * | 1/2007 | Zhevelev et al. | 250/353 |

* cited by examiner

*Primary Examiner* — Christine Sung
(74) *Attorney, Agent, or Firm* — Stephen C. Beuerle; Procopio Cory Hargreaves & Savitch LLP

(57) ABSTRACT

An infrared motion sensor has a multi element IR detector with first and second separate arrays of optical elements associated with respective first and second detector elements and a partition of a material substantially opaque to IR radiation and substantially transparent to visible/NIR light arranged to separate the IR optical paths from the first and second optical elements to the respective first and second detector elements. In this way, the detector elements function individually with respect to IR radiation and individual optical elements produce separate and independently oriented fields of view on the first and second sides of the sensor, while visible/NIR light still falls on both detector elements so that detector element signals resulting from NIR radiation roughly cancel one another.

19 Claims, 6 Drawing Sheets

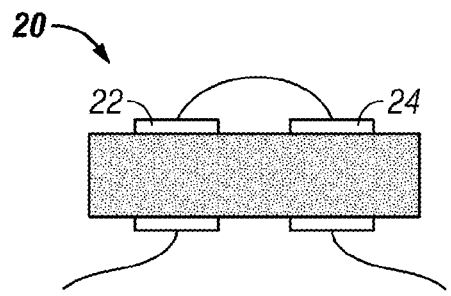
FIG. 3A
*(Prior Art)*
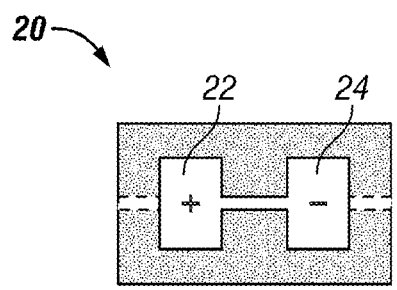
FIG. 3B
*(Prior Art)*
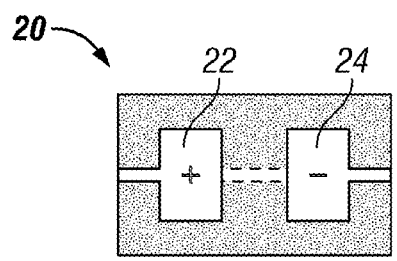
FIG. 3C
*(Prior Art)*
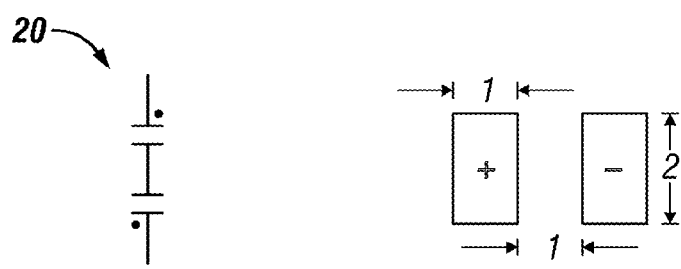
FIG. 3D
*(Prior Art)*
FIG. 3E
*(Prior Art)*

INFRARED MOTION SENSOR

RELATED APPLICATION

The present application claims the benefit of U.S. provisional Pat. App. Ser. No. 61/279,968, filed Oct. 29, 2009, the contents of which are incorporated herein by reference in their entirety.

BACKGROUND

1. Field of the Invention

The present invention relates generally to passive infrared (PIR) motion sensors.

2. Related Art

Passive infrared motion sensors generally consist of several features. An optical element (such as a lens or mirror) and an infrared (IR) detector together define and collect radiation from a field-of-view (intersecting and thus defining a monitored spatial volume), from which the optical element conveys radiation onto an infrared (IR) detector which is generally responsive to mid-IR light in the 6-14 micron wavelength range. The detector, in turn, provides an electrical signal responsive to changes in the effective blackbody temperature of the surfaces of objects within the monitored volume and radiating toward the optical element, which signal is passed to analog processing circuits, which, in turn, create a digital signal that may be directly or indirectly compared to a certain threshold amount of temperature change "seen" by the optical element from within the monitored volume. The digital signal may be further processed by logic circuits in order to provide a desired output indication, for example, of a warmer human crossing in front of cooler objects or background within a monitored volume. Upon detection of changes in radiation as a result of temperature difference between a moving "target" (e.g. a human) and its background, motion sensors generally transmit an indication to a host system, which may in turn activate an intrusion "alarm", change room lighting, open a door, or perform some other function.

An infrared motion sensing system typically comprises an optical-element (lens/mirror) array disposed to direct IR radiation from humans to a juxtaposed IR detector from within volumes to be monitored. Other radiation (e.g. visible and near-infrared [NIR] light) passing through the array to the IR detector is superfluous and can cause false motion sensing, because high levels of such radiation can cause the detector to emit signals even in the absence of IR radiation from within the monitored volumes. To prevent such false motion sensing, IR detector elements are typically placed in opposed-polarity pairs, so that superfluous radiation (not focused by the sensor's IR optical-element array) falls about equally on both elements, which produce approximately equal and opposite signals that cancel each other. However, this practice means that the sensor's optically-monitored volumes are also in opposed-polarity pairs, which places limits on the monitored-volume design.

PIR motion sensors typically employ pyroelectric IR detectors to measure changes in IR radiation intensity. FIGS. 1A to 1C show two views and a schematic symbol of a simple prior art pyroelectric detector 10. Such detectors operate by the "piezoelectric effect", which causes electrical charge migration in the presence of mechanical strain. Pyroelectric detectors take the form of a capacitor—two electrically conductive plates 12 separated by a dielectric 14. The dielectric is often a piezoelectric ceramic. When IR radiation causes a temperature change (and thus some mechanical strain) in the ceramic, electrical charge migrates from one plate to the other. If no external circuit is connected to the detector, then a voltage appears as the "capacitor" charges. If an external circuit is connected between the plates, then a current flows, depending on the resistance of the circuit In either the voltage or current case, a pyroelectric detector's "signal" is very small. These detectors are sensitive, delicate and subject to error due to minute, unintended electrical currents. Therefore, they are typically produced in "clean room" environments and housed in dry-nitrogen-filled hermetically sealed cases. This and other factors cause the pyroelectric detector to be a significant part of the cost (5-10%) of a typical PIR motion sensor, so most PIR motion sensors employ only one or two such detectors.

In order to monitor a large space with only one or two detectors, a typical PIR motion sensor is designed with an array of multiple optical elements (e.g. lenses or mirrors) on the surface of the sensor. FIG. 2 shows a simple prior art PIR motion sensor 15 which has an array of optical elements 16 monitoring a space divided into sub-volumes or monitored volumes 17 corresponding to the fields of view defined by each optical element and the detector. Each optical element focuses the IR radiation from objects within a sub-volume of the monitored space into an image appearing over the detector 10. Since the optical elements can be manufactured inexpensively, the optical array may comprise up to fifty or even more optical elements, with each optical element directing radiation to the detector from a separate sub-volume 17 of the monitored space.

The sub-volumes can be interleaved with non-monitored sub-volumes, so that a radiation-producing target (e.g. a human) passing from sub-volume to sub-volume causes a "target radiation/background radiation/target radiation" pattern at the detector. In the case of humans, since some parts of humans are nearly always radiating with different intensity than that of the background (due to different temperature from that of the background), this pattern causes changing radiation (and thus changing temperature) of the detector. The resulting piezoelectric currents and/or voltages are wave signals versus time, which can be sent through a band pass filter, amplified and sent to the sensor's signal processor for determination of motion by evaluation of the number of wave peaks that exceed a designated reference level.

Over the two decades that pyroelectric detectors have formed the basis for PIR motion sensors, many improvements have reduced the probability of false alarms. To prevent visible and near-infrared light from reaching the detector, optical filters have been added as detector windows. Also, coatings (in the case of mirrors) and additives (for lenses) have been added to prevent the sensor's optical element array from focusing of visible and NIR light onto detectors. These steps have reduced the possibility of PIR motion sensors producing false alarms due to signals caused by, for example, automobile headlights shining through building windows. However, there are practical and cost limitations to such improvements, so it is desirable to employ methods by which the detector itself can emit smaller signals in the presence of superfluous radiation.

One particular method for prevention of false alarms due to interfering visible and NIR light is to place detector elements in pairs of equal size and opposite detection polarity, so that light not focused by sensor's optical element array (i.e. non-IR radiation) tends to be equally incident on both elements, thus causing the signals from the equal and opposite elements to roughly cancel one another. FIGS. 3A to 3D shows three views and a schematic symbol of a typical prior art dual-element detector 20 which has detector elements 22, 24 of equal size and opposite direction polarity. Cancellation is not perfect, as the elements are not exactly equal, and the radiation not exactly uniform. However, the effect improves rejection of non-focused radiation (over that of single-element detectors). Equal and opposed elements can also reduce the undesirable signals resulting from other types of non-intrusion stimuli, such as shock and temperature change.

Detector elements are often of an aspect ratio between 1:2 and 1:4, to approximate the distribution of far infrared radiation from an upright human. FIG. 4A shows the pattern of monitored sub-volumes 25 in a prior art dual-element sensor system 26 resulting from mounting dual opposed-polarity detector elements as in FIG. 3E (aspect ratio 1:2) behind the same optical-element array 16 as in FIG. 2. FIG. 3E is a "functional diagram" illustrating the aspect ratios and juxtaposition of the longitudinal cross-section of monitored sub-volumes 25 arising from the detector elements. As in a sensor with a single element detector, the sub-volumes can be interleaved with non-monitored sub-volumes, so that a radiation producing target (e.g. a human) passing from sub-volume to sub-volume causes a "target radiation/background radiation/target radiation" pattern at the detector. In this case, wave peaks of alternating polarity are generated due to the opposed-polarity elements, as illustrated in FIG. 4B. Again, as in the prior art sensor of FIG. 2, the resulting piezoelectric currents and/or voltages are wave signals versus time, which can be sent through a band pass filter, amplified and sent to the sensor's signal processor for determination of motion by evaluation of the number and polarity of the wave peaks that exceed a designated reference level.

There are some problems with the prior art dual element detector system of FIG. 4A. Because the motion sensor's detectors are generally placed at the focal point of the optical elements, the monitored sub-volumes are a projection of the detector elements' shapes, ever-expanding at an angle defined by the optical focal length and the detector element size. This can be a problem in designing a special kind of motion sensor commonly called a "curtain" sensor. This type of sensor is designed to monitor a long, narrow volume (as might in an actual application be a long, narrow rectangular prism-shaped volume between museum visitors and the objects that they are viewing). Seen from the side, a curtain sensor's set of monitored volumes (being defined by juxtaposition of several optical elements and one dual-opposed-element detector) usually covers a near-90° vertical angle, as may be seen in FIG. 5, in which five pairs of sub-volumes 25 (each similar to the pair shown in FIG. 4A) are defined by a dual-opposed-element detector and five lenses. The so-called "curtain" is a set of monitored volumes which occupies a rectangular prism more high and wide than it is deep, and which is shaped somewhat like the volume occupied by a pleated curtain.

FIG. 6 is a top view of the monitored volumes 25 of the prior art system of FIGS. 4A and 5. Due to the angle, the monitored volumes' shape is not really that of a "curtain", in that the volume grows wider with distance from the sensor. The curtain's shape may be made more constant by using optical elements of different focal lengths for each vertical angle. This type of system is commonly achieved with mirrors of varying focal length. FIG. 7 is a top plan view illustrating a prior art mirror design curtain sensor 38 having monitored volumes 30A, 30B; 32A, 32B; 34A,34B; 35A, 35B, and 36A,36B, where the mirror elements are of different focal lengths so that the angular width of each field of view or monitored volume is different from the other fields of view or monitored volumes on each side of the sensor, while the angle between each pair of fields of view (i.e. 30A and 30B, 32A and 32B, and so on) is approximately equal. The focal lengths are arranged so that the angular width is smaller for the longer fields of view, with the longest field of view or monitored volumes 30A and 30B having the smallest angular widths, thus allowing the "curtain" 40 to remain narrow at longer distances from the sensor, unlike the prior art lens design of FIG. 6. However, sensor systems using mirrors are more expensive and more difficult to manufacture than lens-based systems. Curtain sensor systems with more uniform curtain shape are also possible with lenses of varying focal length, yet, in common motion sensors where lens arrays form the sensor's front face, the design causes a problem of undesirable sensor appearance, since the lenses must be positioned at varying distances from the (shared) detector, producing an unsightly and uneven appearance to the front face of the sensor.

SUMMARY

Embodiments described herein provide a new, curtain-type PIR motion sensor which is lens-based and which provides a "curtain" of monitored volumes.

In one embodiment, an infrared motion sensor comprises a multi element infra red (IR) detector having at least one pair of detector elements comprising a first detector element of a first polarity and a second detector element of a second, opposite polarity, at least one first optical element associated with the first detector element and configured to focus IR radiation from a predetermined first monitored volume onto the first detector element, at least one second optical element associated with the second detector element and configured to focus IR radiation from a predetermined second monitored volume onto the second detector element, and a partition between the first and second detector elements, the partition being of a material which is at least substantially opaque to IR radiation and at least substantially transparent to visible/non IR radiation, and which is configured to substantially block IR radiation from the first optical element from reaching the second detector element and to substantially block IR radiation from the second optical element from reaching the first detector element.

In one embodiment, the first and second detector elements are associated with first and second plural optical elements or arrays of optical elements on respective opposite sides of the IR opaque partition, with the IR partition blocking IR radiation from optical elements on each side of the sensor from reaching the detector element on the opposite side. The detector may comprise a single pair of detector elements with the first detector element on one side and the second detector element on the opposite side of the partition, or may include two or more pairs of detector elements, with all first detector elements on one side of the partition and all second detector elements on the opposite side, along with associated optical elements.

In one embodiment, each optical element in a respective array is at a different angular orientation relative to the respective detector element from the other optical elements so that the fields of view are oriented in different angular directions. The partition separating the first and second arrays of optical elements allows separation between the fields of view or monitored volumes of the two detector elements, so that the fields of view can be oriented individually for each detector element. This is different from prior art PIR sensor designs where fields of view have to be developed in opposite polarity pairs, and the fields of view for corresponding optical elements of the two detector elements must be oriented as a set. This embodiment has the advantage that all optical elements such as lenses or the like can have the same focal length, because net angular coverage is determined by field of view direction rather than varying focal lengths. Instead of varying focal length, orientation of each lens or optical element is varied individually in order to produce a more uniform "curtain" of monitored volumes or fields of view. This means that the front surface of the sensor can be made more even and attractive, while still taking advantage of the lower cost of lens-based IR sensors.

This embodiment of the invention allows realization of a long, narrow curtain shape without a lens-appearance problem, by using variable optical-element/detector-element juxtaposition rather than varying focal length to define the sub-volumes' or monitored volumes' effective angles. In contrast to prior art arrangements with optical elements of varying focal length, the embodiment described above has optical elements having fields of view of substantially equal angular width but oriented in different angular directions when viewed in a horizontal plane.

Since the thin wall or partition between the detector elements is transparent to visible/NIR light, such superfluous radiation still tends to fall equally on each of the opposed-polarity detector elements, so that signals from the opposite polarity detector elements resulting from such radiation cancel out. This greatly reduces the signal generated by superfluous radiation.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3A is a side elevation view similar to FIG. 1A but illustrating a prior art, dual element pyroelectric IR detector;

FIG. 3B is a top plan view of the detection side of the prior art dual element detector of FIG. 3A;

FIG. 3C is a top plan view of the reverse side of the prior art dual element detector of FIGS. 3A and 3B;

FIG. 3D illustrates the schematic symbol for the prior art dual element pyroelectric IR detector of FIG. 3A to 3C;

FIG. 3E is a functional diagram of the prior art dual element detector of FIGS. 3A to 3D;

DETAILED DESCRIPTION

Certain embodiments as disclosed herein provide for a PIR curtain motion sensor system in which a dual-element IR detector with opposite polarity detector elements has separate, independently oriented lenses or optical elements associated with the respective detector elements, where each lens can be angled individually relative to the respective detector element so as to control the spacing between the monitored volumes and thus the width of the "curtain" or set of monitored volumes, without varying the spacing between the respective lenses and the detector elements.

After reading this description, it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 7:
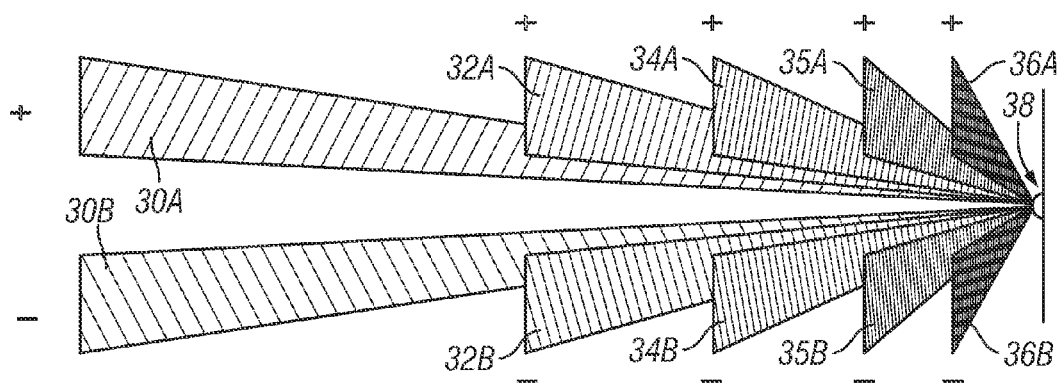
FIG. 7 is a top plan view of the monitored volumes or fields of view of a prior art mirror design IR motion sensor.
Figure 8:
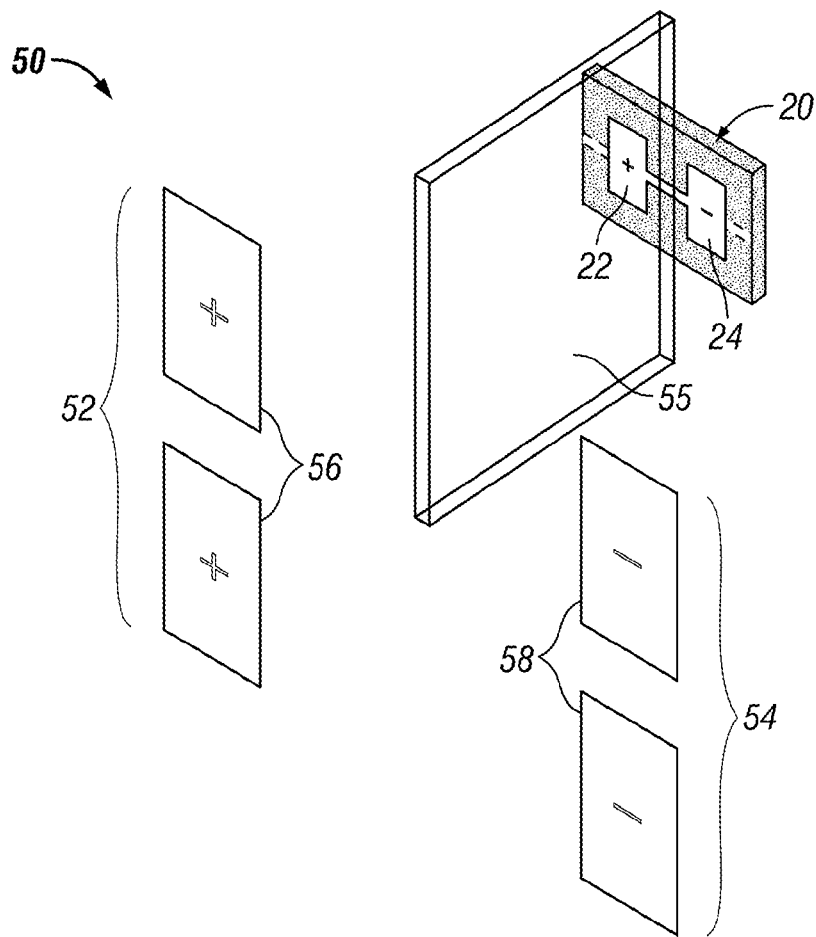
FIG. 8 is a schematic perspective view of one embodiment of a lens-based IR "curtain" motion sensor.
Figure 9:
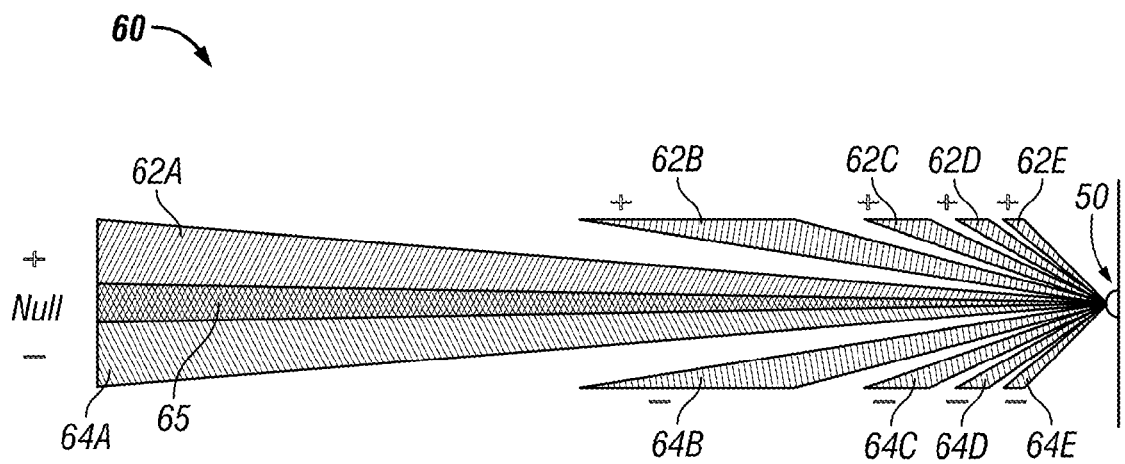
FIG. 9 is a top plan view of the monitored volumes or fields of view of the curtain sensor of FIG. 8.
Figure 10:
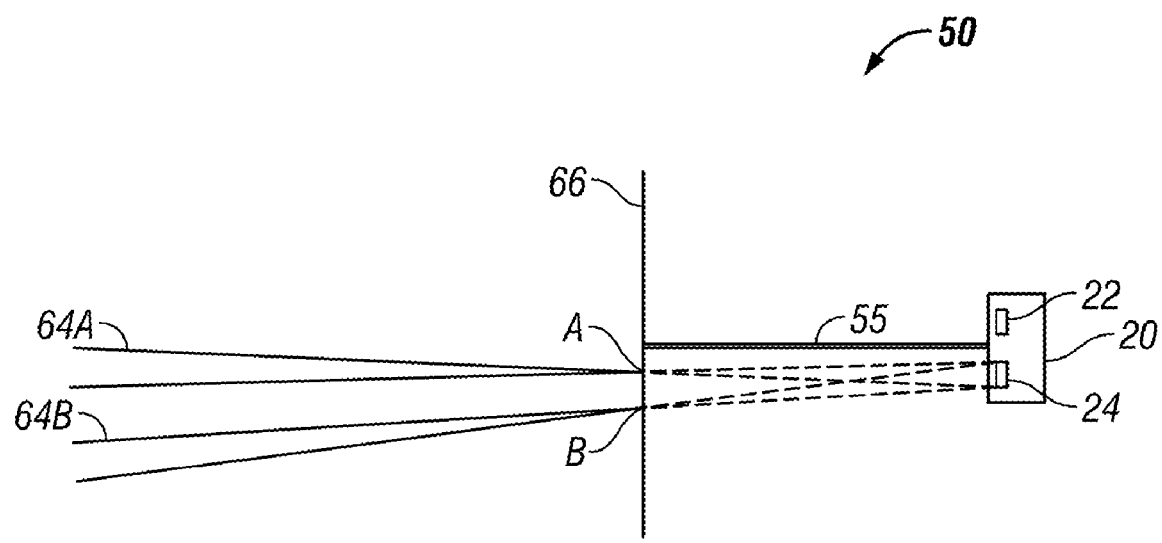
FIG. 10 is an enlarged top view of part of the sensor of FIG. 9, illustrating locations of two of the optical elements in the front surface of the sensor.

As discussed above, FIGS. 1 to 7 illustrate various prior art IR detectors and IR motion sensors, with FIG. 7 illustrating a prior art curtain-type motion sensor using mirrors of varying focal length to produce a more constant curtain shape. FIGS. 8 to 10 illustrate one embodiment of a modified IR curtain sensor 50 which avoids some of the problems of prior art curtain-type motion sensors and which allows curtain shape to be controlled by modifying optical element or lens orientation rather than focal length.

The curtain sensor 50 of FIG. 8 basically comprises an opposed-polarity dual element IR detector 20 similar to that of FIGS. 3A to 3D, having two detector elements 22, 24 of opposite polarity, a first optical element array 52 associated with the first detector element 22, a second optical element array 54 associated with the second detector element 24, and a thin wall or partition 55 made of at least substantially IR-opaque yet visible/NIR-transparent material positioned between the two elements 22, 24 and extending transversely outwardly from the detector 20. In some embodiments, the partition may extend up to the outer surface 66 of the sensor (FIG. 10) on which the optical element arrays are located. The partition need not extend all the way to the outer surface of the sensor, but is of sufficient size to block all IR rays that might otherwise pass from a lens on one side to the detector element on the other side of the sensor. The partition 52 therefore isolates the two detector elements from each other. In this way, the two detector elements are separated, and each can have its own independent optical element or optical elements, rather than a single optical element for both detector elements, as in the prior art arrangement illustrated in FIG. 4A. The partition may be of a clear polymer material such as polycarbonate which is opaque in the mid-IR range and largely transparent in the visible/NIR range, or other similar material.

In FIG. 8, two lenses or optical elements 56 are illustrated on one side in association with the first detector element 22 and two lenses or optical elements 58 are illustrated on the opposite side in association with the second detector element 24. However, a greater or lesser number of optical elements may be provided on each side of the sensor in alternative embodiments. In some embodiments, each optical array may comprise up to fifty or even more optical lenses or elements, depending on the space to be monitored. In other alternative embodiments, a multi-element detector with more than one pair of opposite polarity detector elements may be used in place of the dual element detector 20 of FIG. 8, for example a quad element detector, or detectors with three or more pairs of opposite polarity detector elements. In such alternatives, the partition extends between the positive detector elements on one side and the negative detector elements of each pair on the other side, with each positive and negative detector element associated with a respective array of optical elements.

Figure 1A:
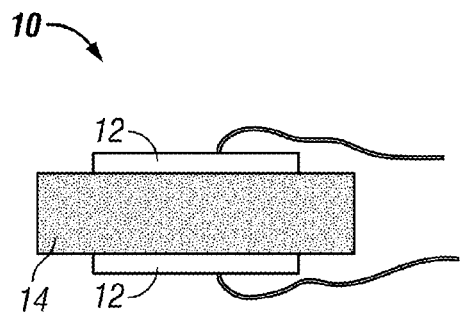
FIG. 1A is a side elevation view of a prior art, single element pyroelectric detector.
Figure 1B:
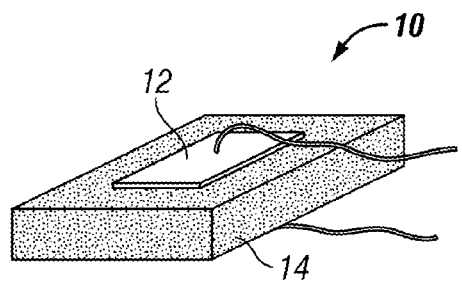
FIG. 1B is a perspective view of the prior art detector of FIG. 1A.
Figure 1C:
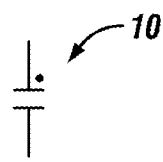
FIG. 1C illustrates the schematic symbol for the prior art pyroelectric IR detector of FIGS. 1A and 1B.
Figure 2:
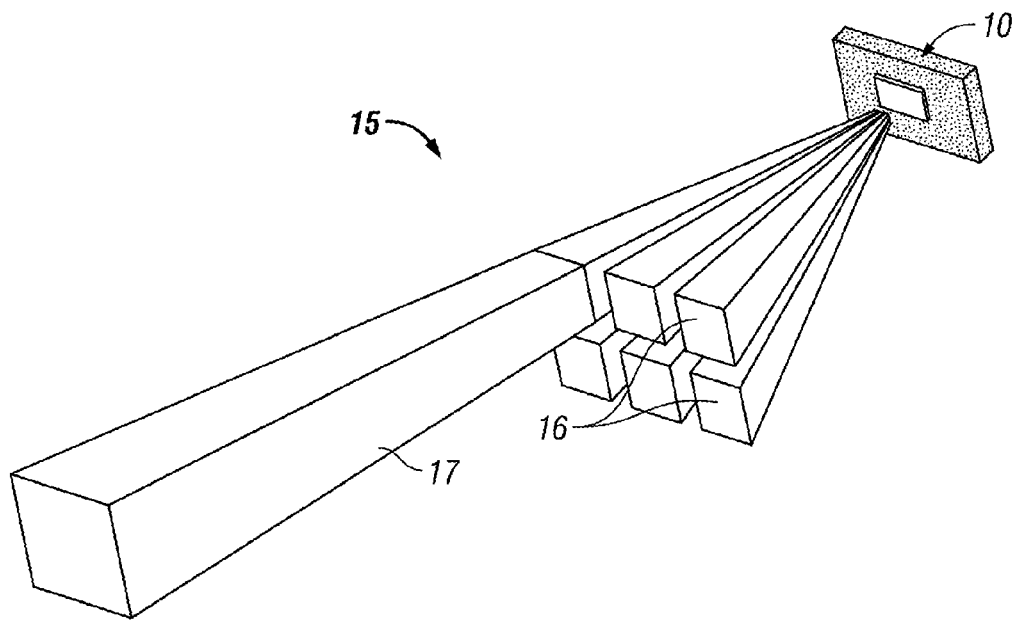
FIG. 2 is a perspective view schematically illustrating the prior art detector of FIGS. 1A to 1C associated with an optical array in a prior art PIR motion sensor, monitoring a space divided into sub-volumes or monitored volumes controlled by the fields of view of the respective optical elements in the array.
Figure 4A:
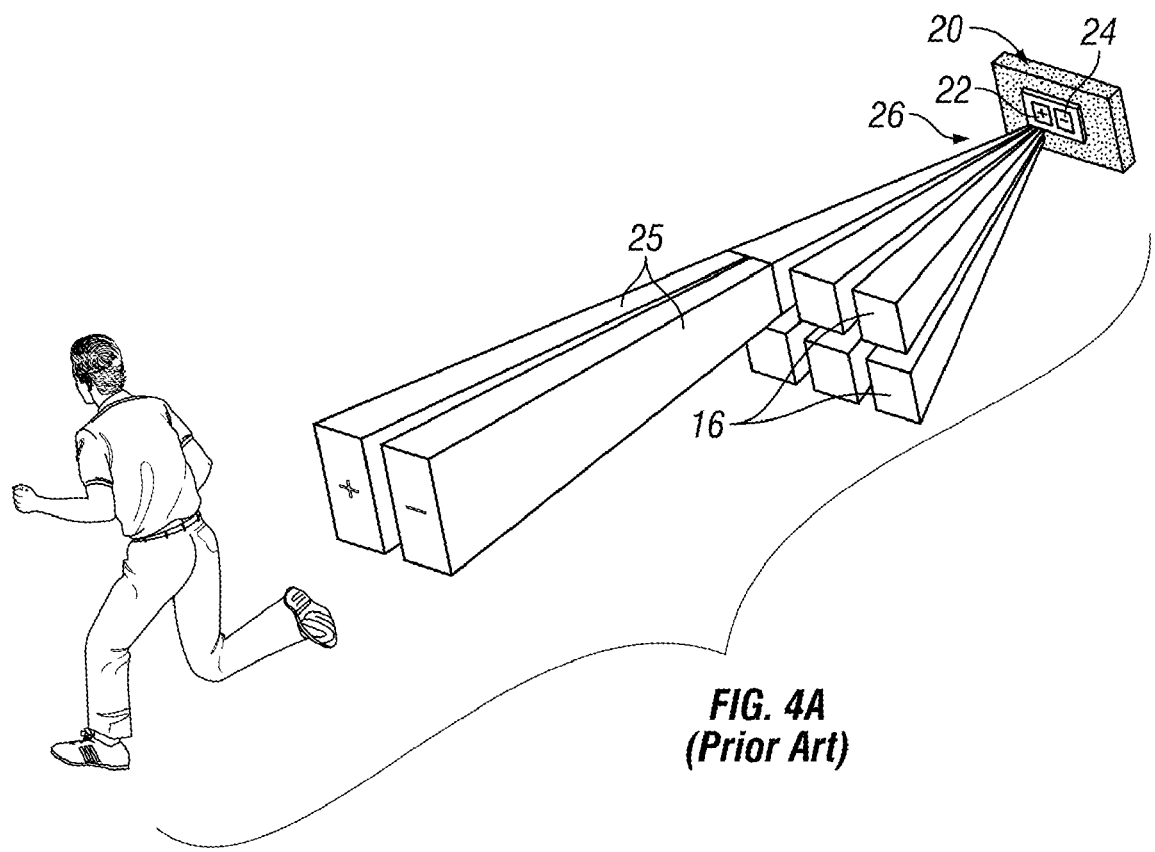
FIG. 4A is a perspective view schematically illustrating the sub-volumes or monitored volumes of a prior art PIR motion sensor utilizing a dual element pyroelectric detector as illustrated in FIG. 3A to 3E positioned behind the same optical array as in FIG. 2, with a human passing through the monitored volumes.
Figure 4B:
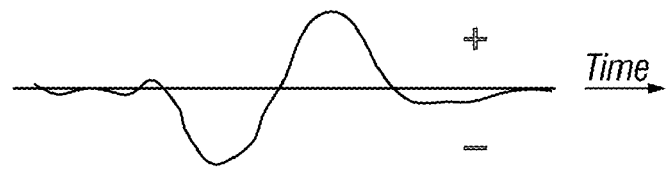
FIG. 4B illustrates one example of an output signal from the prior art sensor of FIG. 4A when a radiation producing target such as a human passes through the monitored volumes as indicated in FIG. 4A
Figure 5:
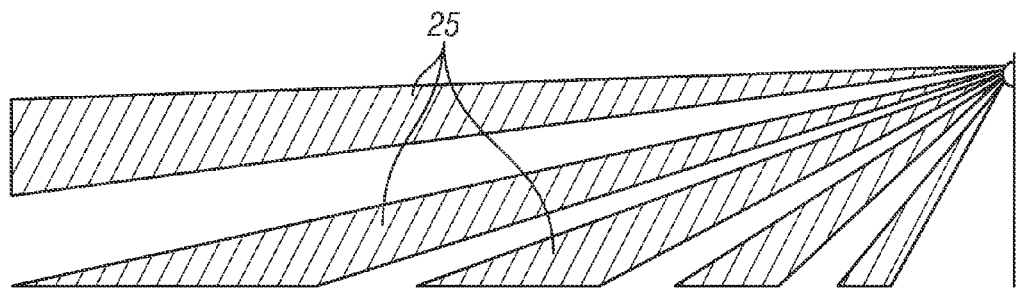
FIG. 5 is a side elevation view of the monitored volumes or fields of view of a prior art "curtain" sensor using a dual element detector as in FIGS. 3A to 4A and five optical elements.
Figure 6:
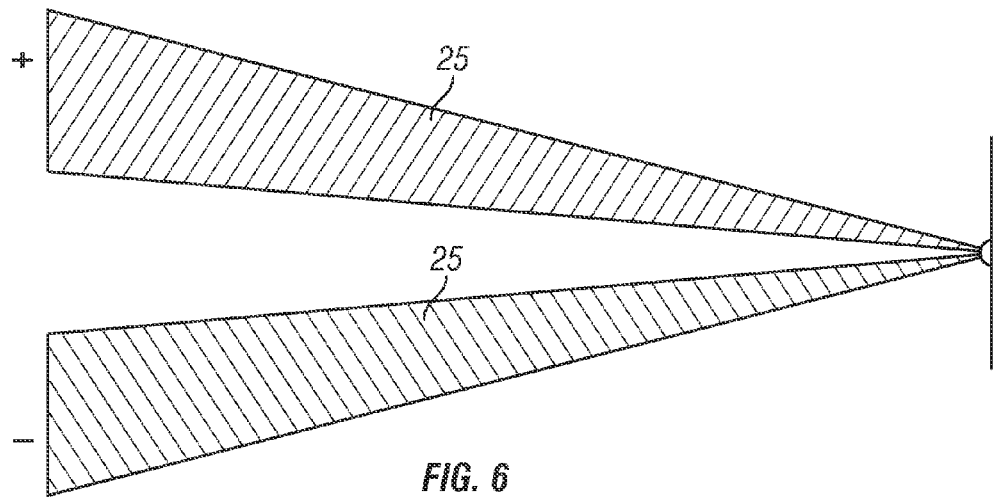
FIG. 6 is a top plan view of the prior art sensor arrangement and monitored volumes of FIG. 5.

In the prior art arrangement of FIGS. 5 and 6, five lenses are used to produce ten monitored volumes, with each lens directing IR radiation onto both detector elements. In the embodiment of FIGS. 8 and 9, ten lenses instead of five are used to monitor ten volumes as in FIGS. 5 and 6, with five lenses associated with each detector element independent from the other detector element. The lenses are arranged to produce the different angular directions of the monitored volumes or fields of view, as illustrated in FIGS. 9 and 10. In this case, each detector element has its own lenses, so the monitored volumes can each be adjusted individually during manufacture of the sensor. Unlike the mirror example of FIG. 7, the lenses in this embodiment all have the same focal length, and thus project monitored volumes are all of the same angular width. The direction of each monitored volume can be controlled to shape the resultant curtain 60.

FIG. 9 illustrates a top view of one example of a "curtain" of ten monitored volumes produced by the sensor of FIG. 8 with the five lenses associated with detector element 22 producing monitored volumes 62A, 62B, 62C, 62D, 62E, and the five lenses associated with detector element 24 producing monitored volumes 64A, 64B, 64C, 64D, and 64E when viewed from above or in a horizontal plane. The side view of the monitored volumes in this embodiment may be identical to that of FIG. 5. In this embodiment, the direction of each monitored volume or field of view can be controlled by suitable selection of the juxtaposition or angle of the respective lens relative to the associated detector element. Thus, as illustrated in FIG. 9, the shorter range monitored volumes or fields of view (i.e. the fields of view which are directed so that they intersect the floor nearer the sensor) such as volumes 62D and 64D and 62E and 64E can be turned outward to widen the curtain at shorter ranges with a wider angle between the respective pairs of fields of view of the same range on each side of the sensor. The longer-range paired volumes such as 62A and 64A are turned inward (even to where the [+] and [−] intersect and partially cancel signals in a null area 65) to narrow the angular spacing between volumes 62A and 64A and thus narrow the curtain at longer ranges, producing a more uniform curtain width or shape. FIG. 9 illustrates one of many possible alternative sensor field of view arrangements which may be achieved by suitable adjustment of the angle of the individual lenses or optical elements so as to control the angular separation in a horizontal plane between monitored volumes or fields of view on respective sides of the monitored area which are monitored by the respective detector elements and associated optical elements. In this embodiment, the angle between the fields of view on opposite sides of the sensor decreases with field of view range, with the maximum angle between fields of view 62E and 64E and the minimum angle between the longest fields of view 62A and 64A. In this embodiment, the fields of view 62A and 64A overlap to produce a null area 65, but the angles may be arranged to vary differently in alternative embodiments, dependent on the dimensions of the area to be monitored. Thus, the individual lenses can be turned so as to vary the shape of the curtain 60 in different embodiments.

As noted above, the partition 55 blocks IR radiation directed from the lenses on one side of the sensor from reaching the detector element on the opposite side of the sensor. Visible or non-IR radiation, on the other hand, is transmitted by the partition. Thus, superfluous radiation still tends to fall equally on each of the opposed polarity detector elements, so that the signals produced by the [+] and [−] detector elements 22, 24 as a result of such radiation still roughly cancel one another, greatly reducing the signal produced by such superfluous radiation.

In one embodiment, the sensor 50 has an outer surface 66 and the partition 55 extends transversely from a location between the detector elements 22, 24 to the center of the outer surface, as illustrated in FIG. 10, and may be joined to the outer surface in some examples. The optical elements are located on the outer surface at substantially the same distance from the detector elements but oriented at different angles to produce the desired curtain shape. The centers A and B of two of the optical elements or lenses 58 of lens array 54 in front surface 66 (with the other lenses omitted for clarity) are illustrated by way of example in FIG. 10, along with the corresponding fields of view (FOV) 64A and 64B and images focused on the detector element 24 as indicated by the dotted lines.

The curtain sensor of FIGS. 8 to 10 monitors volumes by juxtaposing optical elements with discrete (single) IR detector elements, while preserving the superfluous-radiation rejection afforded by opposed-polarity element pairs. Thus, opposed-polarity element pairs are still used, yet IR optical paths to discrete detector elements are partitioned by using material that is opaque to IR radiation, while transparent to superfluous radiation (e.g. visible/NIR light). This way, the detector elements can be arranged to function individually with respect to IR radiation, yet still function in opposed-polarity element pairs when the superfluous-radiation transparent partitions allow such radiation to fall about equally on both elements of each pair.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. An infrared motion sensor comprising:
  a multi element infra red (IR) detector having an outer surface and at least one pair of detector elements comprising a first detector element of a first polarity and a second detector element of a second, opposite polarity located on the outer surface;

at least one first optical element associated with the first detector element and configured to focus IR radiation from a predetermined first monitored volume onto the first detector element;

at least one second optical element associated with the second detector element and configured to focus IR radiation from a predetermined second monitored volume onto the second detector element; and a partition between the first and second detector elements, the partition being of a material which is at least substantially opaque to IR radiation and at least substantially transparent to visible/near IR(NIR) radiation, the partition being configured to at least substantially block all IR radiation from passing from the first optical element to the second detector element and from the second optical element to the first detector element.

2. The sensor of claim 1, comprising an array of first optical elements associated with the first detector element and an array of second optical elements associated with the second detector element, the partition being configured to at least substantially block all IR radiation from passing from any of the first optical elements onto the second detector element and to at least substantially block all IR radiation from passing from any of the second optical elements onto the first detector element, and allowing visible/NIR radiation from the first and second optical elements to pass through the partition onto the second and first detector elements, respectively.

3. The sensor of claim 2, wherein each optical element in a respective array has a field of view which is orientated at an angle to the fields of view of the other optical elements in the respective array when viewed in a horizontal plane, and the fields of view of the two arrays of optical elements are configured to produce a predetermined curtain-like shape.

4. The sensor of claim 3, wherein the optical elements comprise lenses of the same focal length.

5. The sensor of claim 3, wherein the curtain-like shape is of substantially uniform width.

6. The sensor of claim 3, wherein the fields of view of the optical elements in each array are of varying range and the angles of the respective fields of view in a horizontal plane decrease with increasing field of view length.

7. The sensor of claim 1, wherein the sensor has an outer surface on which the optical elements are located and the partition extends from the detector towards the outer surface.

8. The sensor of claim 7, wherein the partition extends from the detector to the outer surface of the sensor at a location between the first and second arrays of optical elements.

9. The sensor of claim 1, wherein the partition is of a clear polymer material.

10. An infrared motion sensor, comprising:
at least one multi element infra red (IR) detector having at least one pair of detector elements comprising a first IR detector element of a first polarity and a second IR detector element of a second polarity;

a first array of first optical elements each having a predetermined field of view and a predetermined field of view direction in a horizontal plane, each first optical element being configured to direct radiation received from its respective predetermined field of view onto the first detector element;

a second array of second optical elements each having a predetermined field of view and a predetermined field of view direction in a horizontal plane, each second optical element being configured to direct radiation received from its respective predetermined field of view onto the second detector element; and a partition of a material at least substantially opaque to IR radiation and at least substantially transparent to visible/near-IR (NIR) radiation located between the first detector element and second detector element and configured to at least substantially block IR radiation from any first optical element from reaching the second detector element and to at least substantially block IR radiation from any second optical element from reaching the first detector element.

11. The sensor of claim 10, wherein the field of view direction of each optical element in each array is different from the field of view direction of the other optical elements in the array when viewed in a horizontal plane.

12. The sensor of claim 11, wherein the optical elements all have the same focal length.

13. The sensor of claim 11, wherein the fields of view of the optical elements are configured to form a curtain of monitored volumes.

14. The sensor of claim 13, wherein the directions of the respective fields of view in a horizontal plane are varied to control the shape of the curtain.

15. The sensor of claim 11, wherein each field of view has an angular width substantially equal to the other fields of view.

16. The sensor of claim 11, wherein the fields of view of the optical elements in each array are of varying range.

17. The sensor of claim 16, wherein the fields of view of at least the first and second optical elements having the longest range overlap to form a null area.

18. The sensor of claim 11, wherein the optical elements in each array are at different angles to the respective detector elements and at substantially the same spacing from the respective detector elements, whereby the fields of view of the respective optical elements are oriented in different angular directions when viewed in a horizontal plane.

19. The sensor of claim 18, wherein the optical elements in each array have fields of view of different ranges, each first optical element having a field of view with a range matching the range of a second optical element to define a pair of fields of view with a predetermined angle between the paired fields of view when viewed in a horizontal plane, and the optical elements are configured such that the predetermined angles between paired fields of view decreases with increasing field of view range.

* * * * *